Aug. 12, 1952   R. N. GORDON   2,606,409
MEANS AND METHOD FOR CONDITIONING PHOTOGRAPHIC APPARATUS
Filed July 25, 1950
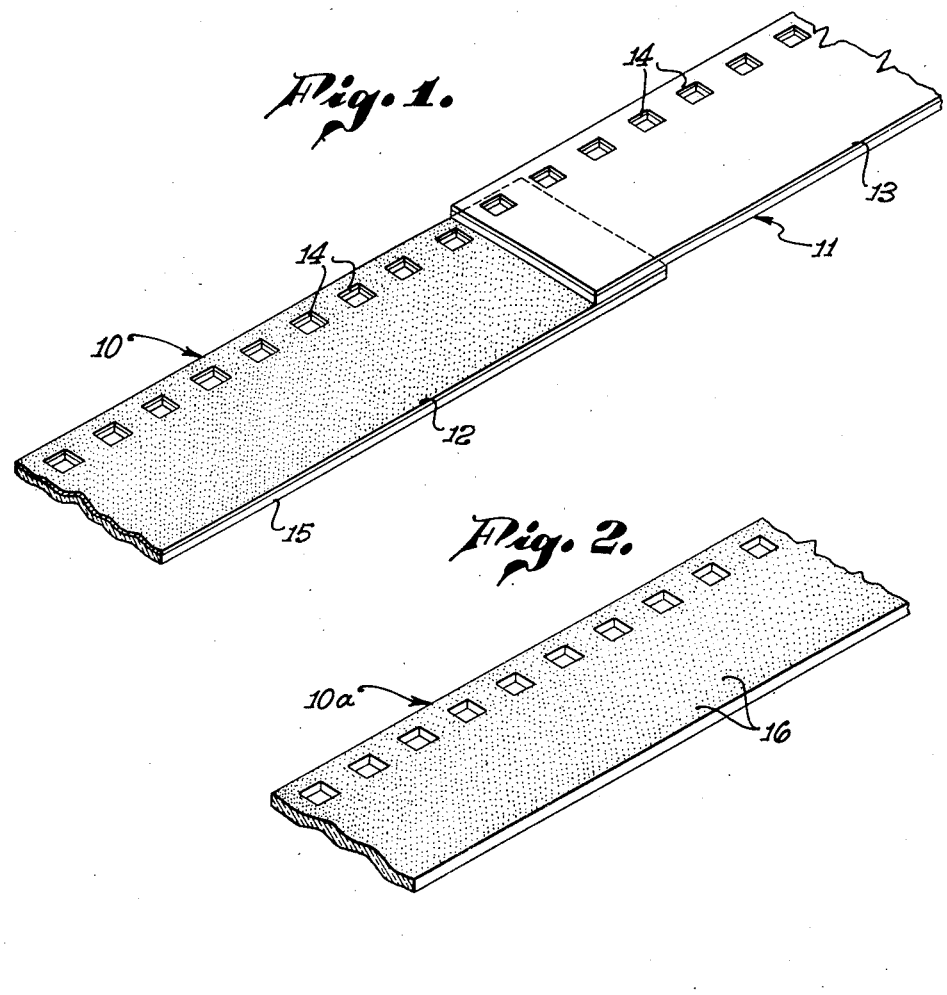
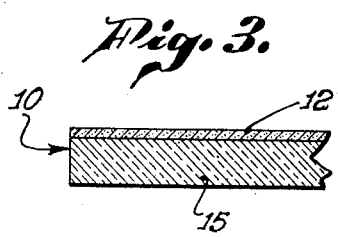
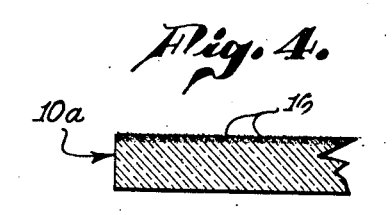
INVENTOR.
ROBERT N. GORDON,
BY
Bernard Kriegel
ATTORNEY.

Patented Aug. 12, 1952

2,606,409

UNITED STATES PATENT OFFICE 2,606,409

MEANS AND METHOD FOR CONDITIONING PHOTOGRAPHIC APPARATUS

Robert N. Gordon, Los Angeles, Calif.

Application July 25, 1950, Serial No. 175,789

3 Claims. (Cl. 51—185)

The present invention relates to photographic apparatus, and more particularly to the maintenance of photographic apparatus in such condition as to insure against the scratching, or other marring, of the surface of the film during its travel through the apparatus.

In photographic apparatus employing flexible film in strip form, such as motion picture projectors and cameras, dust, emulsion, or dirt may become deposited upon the film gate and certain other parts along which the film strip moves. Such dust, emulsion, or dirt particles tend to scratch the film and remove a portion of its emulsion coating. The removed emulsion builds up on the parts and progressively increases their effective size, causing more pronounced and extensive scratching and cutting of the emulsion coating. Similar and deleterious effects on the film and its emulsion coating may be instituted by roughened surfaces or ridges in the photographic apparatus along which the film slides.

The above harmful conditions have been remedied in the past by removing the foreign substances and emulsion from the apparatus and by smoothing the roughened surfaces. However, this could only be accomplished by taking a portion of the apparatus apart, which is a difficult and time consuming operation with some types of equipment. Moreover, the necessity for cleaning and maintaining the equipment became apparent only after the scratched film had been noted by the operator, which was then too late to save the damaged film, or if a camera were being used, to possess a proper record of the scene or scenes that had been photographed.

Accordingly, it is an object of the present invention to prevent scratching and other harmful effects on flexible photographic film without the necessity for dismantling the equipment.

Another object of the invention is to condition photographic apparatus to prevent scratching or marring of the film surface, as an incident of feeding a strip of material through the apparatus in essentially the same manner as the photographic film itself is moved through the apparatus.

A further object of the invention is to employ the film feed mechanism of photographic apparatus for moving a strip through the apparatus, causing the strip to remove foreign substances from the equipment, such as from the film gate. In addition to removing the foreign substances, the strip can be adapted for polishing, burnishing or furbishing the portions of the apparatus along which the film slides, and, if necessary, to both smooth and polish such portions.

Yet another object of the invention is to provide a strip adapted to be fed through photographic apparatus, and having a substance on one or both of its faces capable of polishing, burnishing, furbishing and/or abrading the apparatus, particularly the film gate portion of cinematographic apparatus. The strip ordinarily will be fed through the apparatus with the burnishing, furbishing, polishing or abrading agent facing in the same direction as the emulsion side of the film, when the latter is fed through the equipment.

This invention possesses many other advantages and has other objects which may be made more clearly apparent from a consideration of several forms in which it may be embodied. Some such forms are shown in the accompanying drawings and are described in the present specification, which will now be described in detail, for the purpose of illustrating the general principles of the invention. It is to be understood, however, that such detailed description is not to be taken in a limiting sense, since the scope of the invention is best defined by the appended claims.

Referring to the drawings:

Figure 1 is an isometric view of one form of the invention, disclosing a leader strip attached to motion picture film;

Fig. 2 is an isometric view of a portion of another form of conditioning strip;

Fig. 3 is a cross-section through a fragment of the conditioning strip disclosed in Fig. 1; and Fig. 4 is a cross-section through a fragment of the strip disclosed in Fig. 2.

In its general aspects, the invention contemplates the application of a substance to one or both sides of a strip of flexible material, which can be fed through photographic apparatus for the purpose of cleaning the surfaces of the apparatus with which the emulsion or light-sensitive material of the film comes in contact. In addition to functioning as a cleaning agent, the substance on the strip may also possess such characteristics as to burnish, furbish or polish portions of the apparatus. If necessary, abrasive material can be applied to the strip, so that it actually produces a cutting action on parts of the apparatus that require reconditioning and placement in a smooth and non-harmful condition.

The strip is preferably adapted to be fed through photographic apparatus by the same mechanism that feeds the film through the apparatus. In connection with cinematographic equipment, it may constitute the leader strip connected to the forward end of the film, or it may be constituted as a trailer strip secured to the rear of the film. Regardless of its relation to the film, the strip is fed through the apparatus by the usual film feeding means, and, as an incident of such feeding, the cleaning, polishing, burnishing, furbishing and/or abrasive agent applied to its surface will rub against the portions of the photographic apparatus that contact the photographic film itself, and both place and maintain them in proper condition. As a result, dust and dirt particles are prevented from scratching the film emulsion, and of removing such film emulsion, to produce larger protuberances on the film gate, and other parts of the apparatus, which will increase the extent of scratching and other harmful effects on the film.

As disclosed in Fig. 1, a leader strip 10 of any suitable length, as, for example, five to ten feet, may be secured to the forward end of cinematographic film 11 in any known manner, as by cementing the back side of the film in overlapping relation to the leader strip. The leader strip 10 has a coating 12 of a polishing, burnishing, furbishing and/or abrasive material applied to one of its sides, which faces in the same direction, when attached to the film 11, as the emulsion coating 13 on the film. The strip 10 may be of the same width as the film, and be provided with the same arrangement of perforations 14 along one or both of its marginal portions; so that the usual and same film feeding mechanism for intermittently advancing the film through the photographic apparatus is available for feeding the leader strip 10 through the apparatus. During such feeding, the coating 12 on the leader strip will rub along the same equipment surfaces as the film emulsion 13. Because of the material contained in the coating 12, it will clean such contacted parts of the apparatus, such as the film gate, removing foreign substances therefrom and efficiently polishing the parts, leaving a smooth and imperfection-free surface along which the film emulsion 13 will slide during the feeding of the film through the equipment. A sufficient length of leader strip 10 is employed to insure the proper conditioning of the equipment.

The strip 10 can be made of any suitable material. As an example, it can be made from the same material as uncoated film base. For that matter, the strip could be made of metal, particularly when it is proposed to use it in conjunction with metal film having an emulsion coating which projects its images by reflected light. The strip may also be made of paper of proper strength, textile fabric, etc.

An example of a coating material 12 applied to the strip is the mixing of about two ounces of jewelers' rouge, which is finely divided or powdered ferric oxide, in one quart of a solution comprising eighty per cent acetone by volume and twenty per cent liquid lacquer by volume. This mixture of rouge, lacquer and acetone is then applied to one or both surfaces of the strip 10 in any suitable manner, as by spraying, rolling, painting, dipping, and the like, the acetone softening the base material 15 of the strip, and allowing penetration of the finely divided rouge particles into the surface of the strip. After drying, the strip can then be secured to the film 11, with the jewelers' rouge coating 12 facing in the face, which, upon hardening, will secure the particles securely to the face to the strip.

The strip can also be made with the polishing, furbishing, burnishing and/or abrading material an integral part of the strip. Thus, as shown in Fig. 2, a face 10a of the strip may be softened, as by use of acetone, until the surface of the strip becomes tacky, and finely divided granular or powdered material 16 then dusted onto the surface, which, upon hardening, will secure the particles securely to the face of the strip.

The conditioning material may be embodied in the strip in yet another manner. The cellulose acetate compound, from which the strip is to be made, is mixed with the granular conditioning material while the compound is in a plastic state. The mixture is then rolled or otherwise processed into the desired strip form, with the conditioning material dispersed throughout the strip and present on both of its faces.

The material can also be applied to the face of the strip through use of an adhesive. The strip can first be coated with a suitable adhesive, and, while the adhesive is in a tacky condition, the particles, such as jewelers' rouge, deposited onto the surface. Upon drying of the adhesive, the rouge is firmly anchored to the strip and is available for the performance of its cleaning and polishing functions in passing through the photographic apparatus.

In the event that the film gate and other parts of the apparatus are grooved, a strip with abrasive material applied to its surface can be fed through the apparatus. As an example, powdered Carborundum, preferably of very fine mesh (say 600 grit), may be suitably applied to a face of the strip 10. Upon drawing the strip through the apparatus, the Carborundum will abrade the surface of the film gate and other parts, cutting the ridges or protuberances from the gate and leaving it in a smooth condition. If desired, the Carborundum coated strip can then be followed by a polishing strip containing the jewelers' rouge.

Although particular reference has been made to cinematographic apparatus, that is, to motion picture cameras and projectors, the strip is also applicable to conditioning other types of photographic equipment. As an example, a strip can be passed through a roll film camera, and the polishing or abrading substance upon it will clean and condition the surfaces of the camera along which the sensitized surface of the film passes, insuring against the scratching of such surfaces.

Regardless of the types of photographic equipment that is to be conditioned, the strip may be fed through the equipment alone, and without its being secured to film having a photo-sensitive surface or an emulsion coating. As a matter of convenience, however, it is preferred to attach it to the film itself, since assurance is had that the equipment is in a clean, smooth condition when the film commences its passage through the film gate and other parts.

It is, accordingly, apparent that a strip has been provided which facilitates the cleaning and conditioning of photographic apparatus in a simple, inexpensive and expedient manner, without the necessity for disturbing the assembled relation of the parts of the apparatus to one another. In addition, a simple method of cleaning and conditioning photographic apparatus results from use of the coated or impregnated strip.

The inventor claims:

1. The method of conditioning cinematographic apparatus embodying film feeding mechanism, comprising securing a strip to photographic film having marginal perforations, said strip having marginal perforations and a powdered abrasive material applied to that surface of the strip which faces in the same direction as the emulsion side of the film, and operating the film feeding mechanism of said apparatus to feed said strip through said apparatus.

2. A flexible strip of sheet material adapted to be moved through photographic apparatus which has a feeding mechanism for moving photographic film therein, said strip being of substantially the same width as the photographic film and having marginal perforations for cooperation with the feeding mechanism to move the strip in the apparatus, said strip having a powdered abrasive material on one of its faces disposed over substantially the entire area of said one face.

3. A flexible strip of sheet material adapted to be moved through photographic apparatus which has a feeding mechanism for moving photographic film therein, said strip being of substantially the same width as the photographic film and having marginal perforations for cooperation with the feeding mechanism to move the strip in the apparatus, said strip having powdered abrasive material disposed over substantially the entire area of both of its faces.

ROBERT N. GORDON.

REFERENCES CITED

The following references are of record in the file of this patent:

UNITED STATES PATENTS

| Number | Name | Date |
|---|---|---|
| 217,300 | Starr | July 8, 1879 |
| 1,138,479 | Hough | May 4, 1915 |
| 1,208,688 | Stempel, Jr. | Dec. 12, 1916 |
| 1,401,012 | Teitel | Dec. 20, 1921 |
| 1,850,413 | Porte | Mar. 22, 1932 |
| 1,926,981 | Gould, Jr. | Sept. 12, 1933 |
| 2,105,915 | Griffin | Jan. 18, 1938 |
| 2,165,566 | Meakin | July 11, 1939 |